(12) United States Patent
Davis

(10) Patent No.: US 9,448,596 B2
(45) Date of Patent: Sep. 20, 2016

(54) SYSTEM WAVEGUIDE INTERFACE

(71) Applicant: Lenovo (Singapore) Pte. Ltd., Singapore (SG)

(72) Inventor: Mark Charles Davis, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 252 days.

(21) Appl. No.: 14/081,642

(22) Filed: Nov. 15, 2013

(65) Prior Publication Data

US 2015/0138714 A1 May 21, 2015

(51) Int. Cl.
*G06F 1/16* (2006.01)

(52) U.S. Cl.
CPC ........... *G06F 1/1698* (2013.01); *G06F 1/1654* (2013.01); *G06F 1/1683* (2013.01)

(58) Field of Classification Search
CPC .. G06F 1/1654; G06F 1/1698; G06F 1/1683; H01R 13/629; H01R 13/6315; H05K 7/1092; H05K 3/046; G02B 6/3886; H01P 5/02
USPC ..................................................... 361/679.28
See application file for complete search history.

(56) References Cited

U.S. PATENT DOCUMENTS

| | | | | |
|---|---|---|---|---|
| 5,106,181 A * | 4/1992 | Rockwell, III | ...... | G02B 6/0026 385/1 |
| 5,889,602 A * | 3/1999 | Johnson | ................ | G06F 1/1616 398/115 |
| 6,252,767 B1 * | 6/2001 | Carlson | ................ | G06F 1/1616 292/148 |
| 7,142,748 B1 * | 11/2006 | Yang | ........................ | G02B 6/30 385/14 |
| 7,778,503 B2 * | 8/2010 | Schorpp | ............... | G02B 6/4214 385/14 |
| 2008/0111746 A1 * | 5/2008 | Levy | ..................... | G06F 1/1616 343/702 |
| 2010/0265648 A1 * | 10/2010 | Hirabayashi | ......... | G06F 1/1616 361/679.28 |
| 2010/0321255 A1 * | 12/2010 | Kough | ................. | H01Q 1/2266 343/702 |
| 2011/0194240 A1 * | 8/2011 | Hansen | ................. | G06F 1/1698 361/679.28 |
| 2012/0166676 A1 * | 6/2012 | Roper | ....................... | G06F 9/54 709/250 |
| 2013/0063873 A1 * | 3/2013 | Wodrich | ............... | G06F 1/1635 361/679.01 |
| 2014/0043745 A1 * | 2/2014 | McCormack | .......... | G06F 13/00 361/679.09 |

OTHER PUBLICATIONS

Silicone Materials for Optical Applications, Form No. 75-1007-01, Dow Corning, 2003 (6 pages).
Wireless LAN at 60 GHz—IEEE 802.11ad Explained, Application Note, Agilent Technologies, May 30, 2013 (28 pages).
Pfeiffer et al., A Chip-Scale Packaging Technology for 60-GHz Wireless Chipsets, IEEE Trans Microwave Theory and Tech., vol. 54, No. 8, Aug. 2006 (11 pages).

* cited by examiner

*Primary Examiner* — Courtney Smith
*Assistant Examiner* — Michael Matey
(74) *Attorney, Agent, or Firm* — Brian J. Pangrle

(57) ABSTRACT

A system can include a display unit that includes extremely high frequency (EHF) radio frequency band communication circuitry; a base unit that includes extremely high frequency (EHF) radio frequency band communication circuitry; a mechanism that releasably couples the display unit and the base unit to define a coupled state; a hinge that orients the display unit with respect to the base unit in the coupled state; and a polymer ribbon waveguide that interconnects the communication circuitry of the display unit and the communication circuitry of the base unit in the coupled state. Various other apparatuses, systems, methods, etc., are also disclosed.

16 Claims, 9 Drawing Sheets

SYSTEM WAVEGUIDE INTERFACE

TECHNICAL FIELD

Subject matter disclosed herein generally relates to technologies and techniques for system interfaces.

BACKGROUND

A system may include units that communicate via a system interface. As an example, such a system may include a system interface that includes pins and sockets, for example, where one of the units of the system includes the sockets, which are configured for receipt of the pins of another one of the units of the system.

SUMMARY

A system can include a display unit that includes extremely high frequency (EHF) radio frequency band communication circuitry; a base unit that includes extremely high frequency (EHF) radio frequency band communication circuitry; a mechanism that releasably couples the display unit and the base unit to define a coupled state; a hinge that orients the display unit with respect to the base unit in the coupled state; and a polymer ribbon waveguide that interconnects the communication circuitry of the display unit and the communication circuitry of the base unit in the coupled state. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
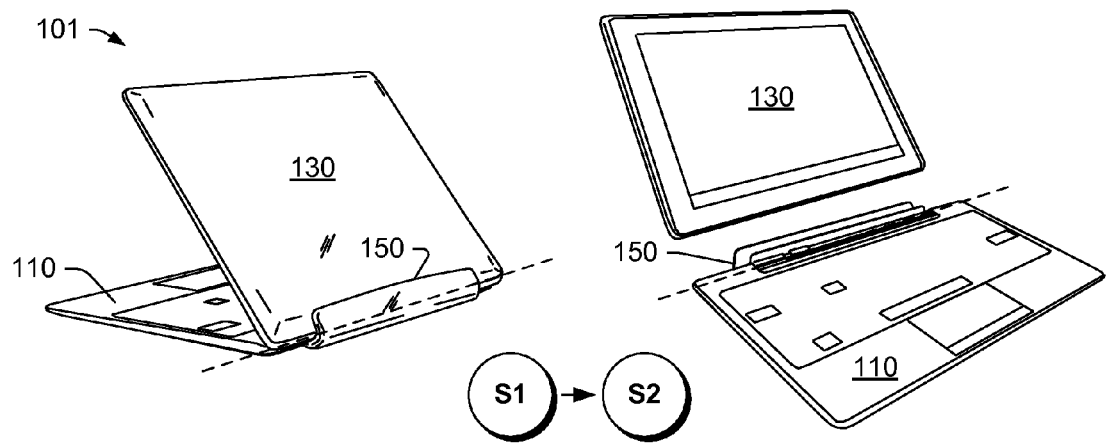
FIG. 1 is a diagram of an example of a system.
Figure 1:
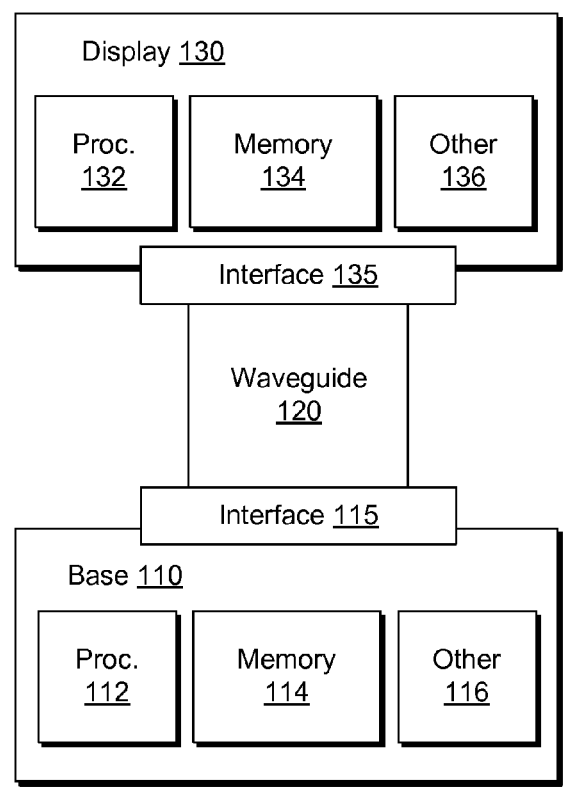

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

As mentioned, a system may include units that communicate via a system interface. Such a system interface may include pins on one of the units and sockets on another one of the units where the pins can be physically received by the sockets to form electrical contacts (e.g., a wired interface). Such an interface may be referred to as an electro-mechanical interface or an electro-mechanical coupling mechanism. An electro-mechanical interface may be configured for connection and disconnection, for example, to allow for operatively coupling and decoupling units of a system. Examples of electro-mechanical interfaces include plug and socket connectors where a male plug that includes pins physical couples to a female receptacle that includes sockets for the pins. Plug and socket connectors tend to be rigid and made of metal, hardened plastic and metal, etc. As such connectors rely on physical contact between conductive material, coupling and decoupling can introduce wear, stress, misalignment, etc. Over time, an electro-mechanical interface may fail and require replacement.

As an example, for a system with units, failure of an electro-mechanical interface may render the system or one of its units practically inoperable. For example, consider a keyboard unit that couples to a display unit via an electro-mechanical plug and socket interface. In such an example, where pins of the plug become bent or broken, the unit that includes the pins may no longer be operatively coupled to the unit that includes the socket, which can make one of the units practically inoperable or, for example, make the system practically inoperable.

As an example, a system can include a display unit that includes radio frequency band communication circuitry; a base unit that includes radio frequency band communication circuitry; a mechanism that releasably couples the display unit and the base unit to define a coupled state; and a polymer ribbon waveguide that interconnects the communication circuitry of the display unit and the communication circuitry of the base unit in the coupled state. Such a system may also include, for example, a hinge that orients the display unit with respect to the base unit in the coupled state. In such an example, the hinge may be part of or include the mechanism that releasably couples the display unit and the base unit.

As to radio frequency band communication circuitry, such circuitry may include extremely high frequency (EHF) radio frequency (RF) band communication circuitry. The EHF RF band may span from about 30 GHz to about 300 GHz. Wavelengths may be about ten to about one millimeter (e.g., depending on medium), which gives rise to labels such as millimeter band or millimeter wave (e.g., sometimes abbreviated MMW or mmW). In the United States, 47 CFR §15.255 is entitled "Operation within the band 57-64 GHz", which provides information as to emission levels within the EHF RF band from 57 to 64 GHz.

As an example, a system may include a tablet unit with a display and a keyboard unit that may be operatively coupled for communications (e.g., transmission and reception of information) via a wireless interface that includes a polymer ribbon waveguide. As an example, the system may include one or more radio transmitters that can operate in EHF RF bands such as in a frequency range from about 30 GHz to about 300 GHz, for example, in a frequency range from about 57 GHz to about 64 GHz. In such an example, the polymer ribbon waveguide may be flexible and may include a positionable end and a fixed end. For example, the fixed end may align with a transmitter and the positionable end may align with a receiver or vice versa. As an example, a polymer ribbon waveguide may be aligned at one end with communication circuitry of one unit of a system and aligned at another end with communication circuitry of another unit of the system where the two units may be coupled and decoupled. In such an example, the communication circuitry of each of the units may be configured for both transmission and receipt of information (e.g., the polymer ribbon waveguide may provide for bi-directional communication).

As an example, where two units of a system may be oriented with respect to each other, for example, to form an angle, a polymer ribbon waveguide may be configured to align with communication circuitry responsive to orienting the two units with respect to each other. For example, where the two units may be represented by planes that form an angle about a hinge, a polymer ribbon waveguide may bend in a manner dependent on the angle. As an example, a component or components may cause a free end (e.g., a positionable end) of a polymer ribbon waveguide to align with communication circuitry (e.g., an antenna of the communication circuitry that can emit and/or receive EHF RF).

As an example, where a system includes a hinge that couples two units (or more than two units) for pivotable orientations about an axis of the hinge, a polymer ribbon waveguide may be adjusted responsive to pivotable adjustment from one orientation to another orientation of the two units about the axis of the hinge.

As an example, a system may include an alignment mechanism that includes magnetic components that include at least one magnet. For example, magnetic components may include a magnet and another component that includes a magnetic substance that is attracted to the magnet or repelled by the magnet. Substances that are negligibly affected by magnetic fields may be referred to as non-magnetic substances, for example, consider copper and aluminum; noting that movement of such substances in a magnetic field or upon exposure to a time-varying magnetic field may generate eddy currents therein, which may exert a force that may oppose a magnet.

A piece of magnetic material includes two poles, which may be referred to as a north pole and a south pole. As an example, a magnet may be an assembly of pieces of magnetic materials or a unitary piece of magnetic material. As an example, a magnet may be an electromagnet where its magnetism stems from current, which may be adjusted in direction, adjusted in magnitude, switched on, switched off, etc. As an example, a magnetic field strength or magnetic flux density of a magnet may be specified in gauss (G).

As an example, a system may include an alignment guide (e.g., such as one cylinder inside another) that can bend a polymer ribbon waveguide in the proper direction. In such an example, the alignment guide may include components, which may optionally include a magnetic component.

As an example, a waveguide may be a polymer waveguide made of an organic polymer, an inorganic polymer or an organic polymer and an inorganic polymer. As an example, an organic polymer may be polyurethane. As an example, a siloxane polymer may act as a waveguide for EHF RF energy with relatively low loss.

FIG. 1 shows an example of a system 101 that includes a base unit 110 and a display unit 130 that may be coupled via a mechanism 150, which may include a hinge configured to allow pivotable orientations of the display unit 130 with respect to the base unit 110 about a hinge axis. For example, the mechanism 150 may provide for orientating the display unit 130 at various angles with respect to the base unit 110 about a hinge axis (e.g., for viewing, for protecting a display surface, for protecting keys of a keyboard, for placing the system in a particular state such as an off state or a sleep state, etc.).

As shown in FIG. 1, the system 101 may be in a coupled or attached state (S1) or an uncoupled or detached state (S2). As shown, the base unit 110 may include a processor 112, memory 114, an interface 115 and one or more other components 116 and the display unit 130 may include a processor 132, memory 134, an interface 135 and one or more other components 136. In the example of FIG. 1, a waveguide 120 may be a polymer ribbon waveguide that is part of the base unit 110, the display unit 130 or the mechanism 150, which is shown as being operatively coupled to the base unit 110.

As an example, the waveguide 120 may include a free end (e.g., a positionable or adjustable end) and a fixed end. In such an example, the free end may be automatically adjusted upon orientating the display unit 130 with respect to the base unit 110. In the decoupled state (S2), the base unit 110 or the mechanism 150 may retain the waveguide 120 while the display unit 130 retains its interface 135, operatively decoupled from the waveguide 120.

As an example, the waveguide 120 may be flexible (e.g., bendable), for example, such that where the mechanism 150 includes a pivotable hinge, the waveguide 120 may bend as the hinge pivots. In such an example, a free end of the waveguide 120 may be oriented in a direction ready to be operatively coupled to the interface 135 of the display unit 130. Accordingly, upon transitioning from the decoupled state (S2) to the coupled state (S1), the interfaces 115 and 135 may be used for communication (e.g., transmission and receipt of information).

As an example, the interfaces 115 and 135 may be configured for unidirectional or bidirectional communications. As an example, the base unit 110 may include keys where depression of one of the keys causes circuitry of the base unit 110 to transmit a signal via the interface 115. In turn, the interface 135 of the display unit 130 may receive the signal via the waveguide 120 where circuitry of the display unit 130 may respond to the signal (e.g., rendering a graphic to a display of the display unit 130, etc.).

In the example of FIG. 1, the system 101 may be a wireless system in that wired connections do not exist between the base unit 110 and the display unit 130. In such an example, as to power, the base unit 110 and the display unit 130 may each have a respective power supply (e.g., battery, etc.). As an example, the system 101 may be configured for wireless transmission of power. For example, the base unit 110 may include a transmitter and the display unit 130 may include a receiver such that the base unit 110 may transmit energy for receipt by the display unit 130. As an example, a wireless transmission mechanism for power may include circuitry for inductive coupling of the base unit 110 and the display unit 130 (e.g., to charge a battery, run a unit, etc.).

As an example, a system may include a first induction coil that can generate an alternating electromagnetic field and a second induction coil that can receive power from the electromagnetic field and converts it back into electrical current (e.g., forming a transformer). As an example, a system may include circuitry for resonant inductive coupling. As an example, a system may include two-way charging, for example, where a display unit can charge a base unit and where a base unit can charge a display unit. In such an example, sensing may occur to determine which unit has more power and therefor which unit acts as a charger (e.g., more power) to charge the other unit (e.g., less power).

Figure 2:
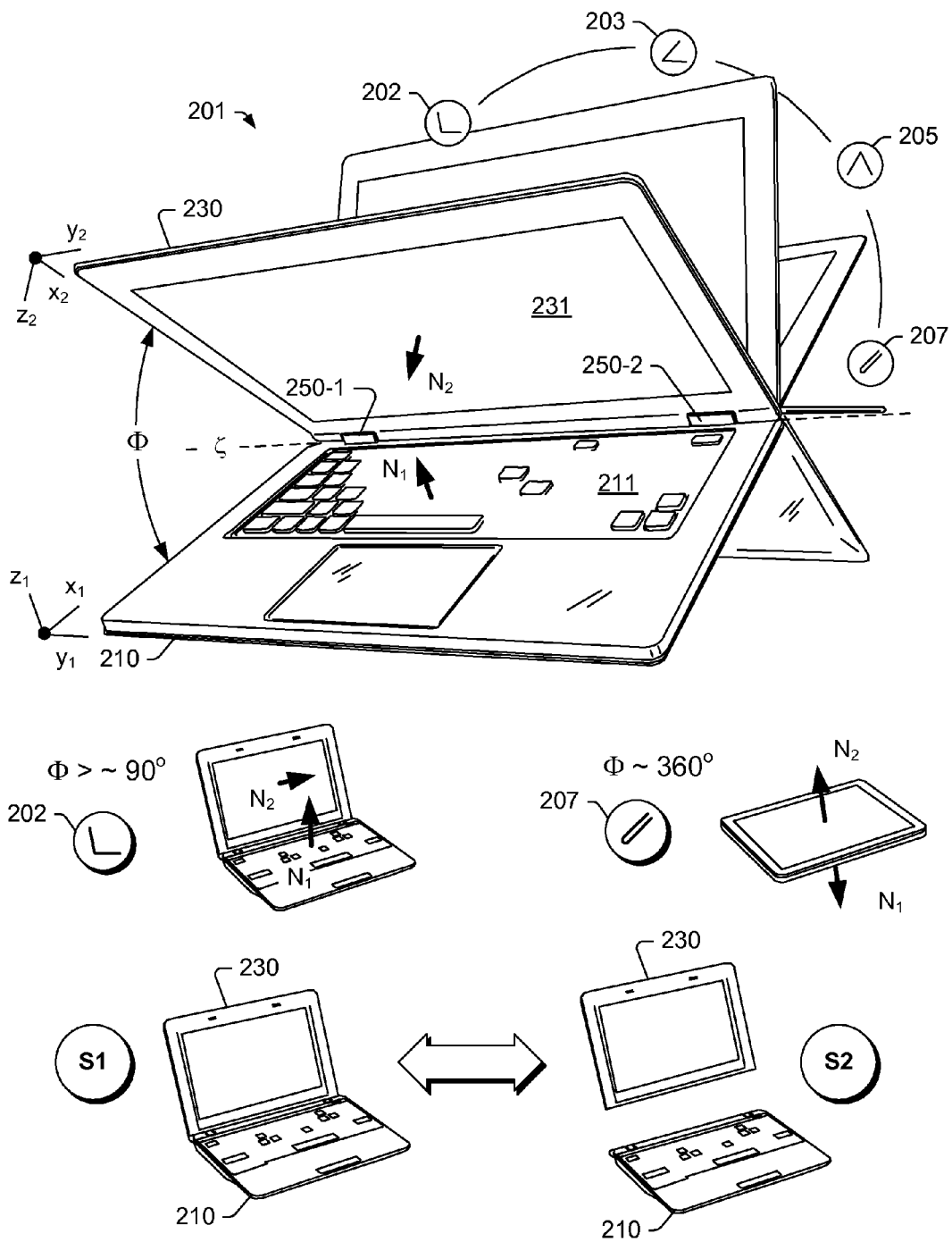
FIG. 2 is a diagram of an example of a system.

FIG. 2 shows an example of a system 201 that includes a keyboard housing 210 and a display housing 230 that are pivotable with respect to each other via movement about one or more hinges 250-1 and 250-2. In the example of FIG. 2, the keyboard housing 210 may be a first unit and the display housing 230 may be a second unit. As an example, the system 201 may include one or more processors, memory (e.g., one or more memory devices), one or more network interfaces, and one or more power cells. Such components may be, for example, housed with the keyboard housing 210, the display housing 230, the keyboard housing 210 and the display housing 230, etc.

As shown in the example of FIG. 2, the keyboard housing 210 includes a keyboard 211 with keys and the display housing 230 includes a display 231. In such an example, the keyboard 211 is defined in a first Cartesian coordinate system as having a width along an x-axis ($x_1$), a length along a y-axis ($y_1$) and a height along a z-axis ($z_1$) that extends in a direction outwardly away from touch surfaces of keys of the keyboard 211 and the display 231 is defined in a second Cartesian coordinate system as having a width along an x-axis ($x_2$), a length along a y-axis ($y_2$) and a height along a z-axis ($z_2$) that extends in a direction outwardly away from a viewing surface of the display 231.

As shown in the example of FIG. 2, the one or more hinges 250-1 and 250-2 pivotably connect the keyboard housing 210 and the display housing 230 for orienting the display housing 230 with respect to the keyboard housing 210. For example, orientations may include orientations definable with respect to an axis (e.g., or axes) such as the axis $\zeta$ and an angle $\Phi$ about that axis.

FIG. 2 shows some examples of orientations 202, 203, 205 and 207. The orientation 202 may be a notebook orientation where the angle $\Phi$ is about 90 degrees or more (e.g., or optionally somewhat less than about 90 degrees depending on position of a user, etc.). As an example, the keyboard housing 210 may include one or more other input devices (e.g., a control stick, a touchpad, etc.).

As to the orientation 203, it may correspond to a display orientation for viewing the display 230 where the keyboard 211 faces downward and the system 201 is supported by the keyboard housing 210 (e.g., by a rim about the keyboard 211, a frontal surface, etc.). As to the orientation 205, it may correspond to a "tent" orientation where the display 231 faces outwardly for viewing on one side of the tent and the keyboard 211 of the keyboard housing 210 faces outwardly on the other side of the tent.

The orientation 207 may be a tablet orientation where the angle $\Phi$ is about 360 degrees such that a normal outward vector $N_1$ of the keyboard 211 of the keyboard housing 210 and a normal outward vector $N_2$ of the display 231 of the display housing 230 are oriented in oppositely pointing directions, pointing away from each other; whereas, in contrast, for a closed orientation of the system 201 (e.g., where the angle $\Phi$ is about 0 degrees), the vectors $N_1$ and $N_2$ would be pointing toward each other.

As shown in the example of FIG. 2, the system 201 may be configured in a coupled state (S1) or a decoupled state (S2) (e.g., being configured for transitions therebetween). As an example, in the coupled state (S1), a waveguide may be provided that bridges an interface of the keyboard housing 210 and an interface of the display housing 230. Such a waveguide may be flexible and optionally capable of bending to accommodate the orientations of the system 210 (e.g., the orientations 202, 203, 205 and 207). As an example, at least one of the hinges 250-1 and 250-2 may include a waveguide, which may be, for example, a polymer ribbon waveguide. As an example, the keyboard housing 210 may include EHF RF communication circuitry and the display housing 230 may include EHF RF communication circuitry where a polymer ribbon waveguide is provided as a medium for transmission of EHF RF therebetween.

Figure 3:
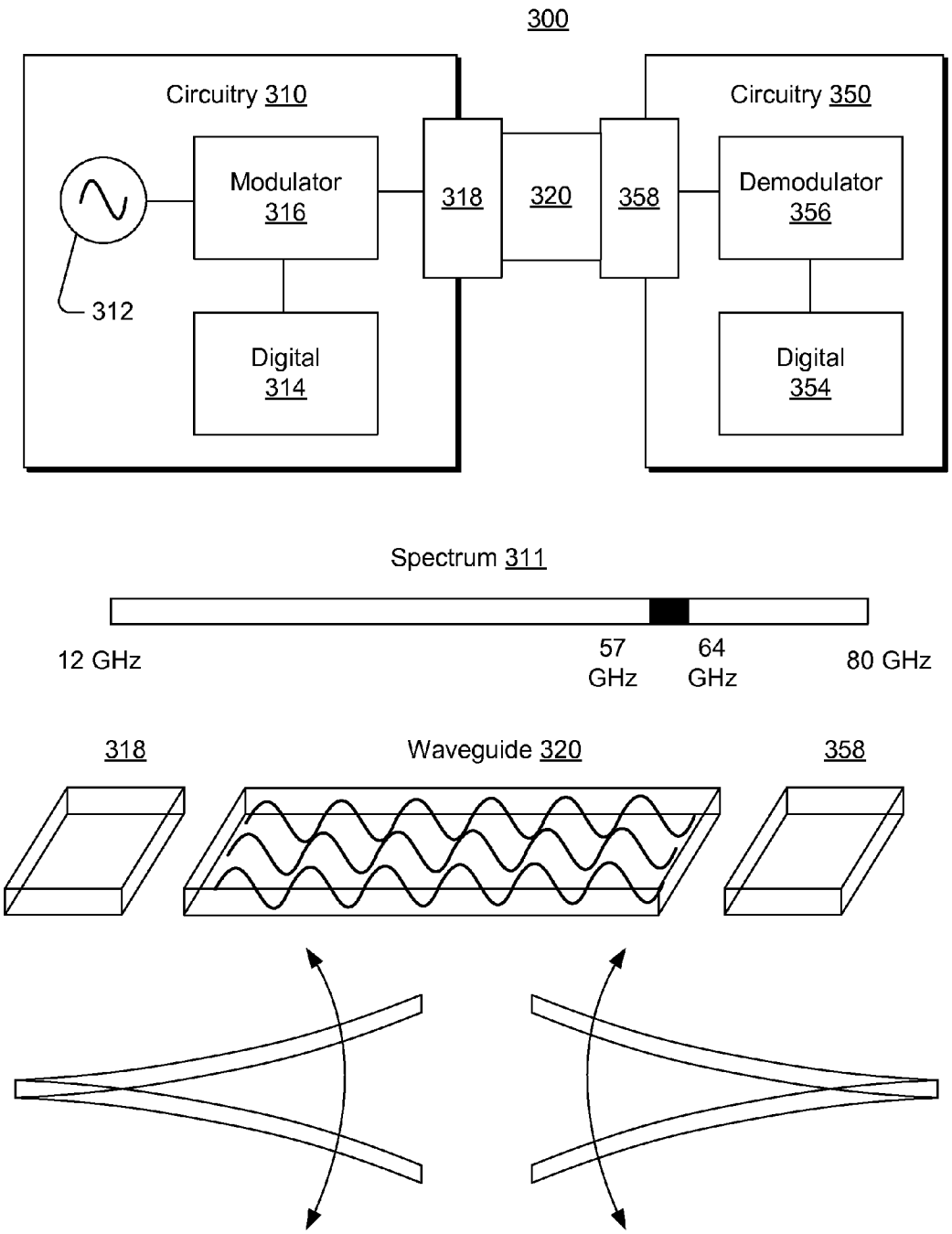
FIG. 3 is a diagram of example of a system that includes a waveguide.

FIG. 3 shows an example of a system 300 that includes circuitry 310 with an interface 318 and circuitry 350 with an interface 358 where a waveguide 320 bridges the interfaces 318 and 358, optionally without physically contacting one or both of the interfaces 318 and 358. As shown, the circuitry 310 includes a RF generator 312, digital signal circuitry 314 and modulator circuitry 316, for example, to module RF generated by the RF generator 312 for a given digital signal provided by the digital signal circuitry 314 and the circuitry 350 includes and digital signal circuitry 354 and demodulator circuitry 356, for example, to demodulate RF for presence of a digital signal that may be output to the digital signal circuitry 354. In the example of FIG. 3, the circuitry 310 may provide modulated RF energy to the interface 318 for communication via the waveguide 320 where the circuitry 350 may receive the modulated RF energy via the interface 358 for demodulation via the demodulator circuitry 356. As an example, a unit or units of a system may include circuitry 310 and circuitry 350, for example, a unit may include a RF generator, modulator circuitry and demodulator circuitry.

FIG. 3 also shows an example of a spectrum 311, which ranges from about 12 GHz to about 80 GHz. As an example, the system 300 may operate at one or more frequencies in the spectrum 311. The spectrum 311 may include a portion that ranges from about 57 GHz to about 64 GHz. As an example, the system 300 may operate at one or more frequencies in such a portion of the spectrum 311.

FIG. 3 also shows an example of the waveguide 320 as having a ribbon configuration. For example, the waveguide 320 may include a rectangular cross-section or rectangular cross-sections. The waveguide 320 may be positioned proximate to the interfaces 318 and 358 where, for example, one or both of the interfaces 318 and 358 may be positionable (e.g., movable). As an example, the waveguide 320 may be positionable at one end while optionally being fixed at another, opposing end. As an example, a waveguide may be positionable at both ends, for example, a waveguide may be independently positionable at opposing ends of the waveguide.

Figure 4:
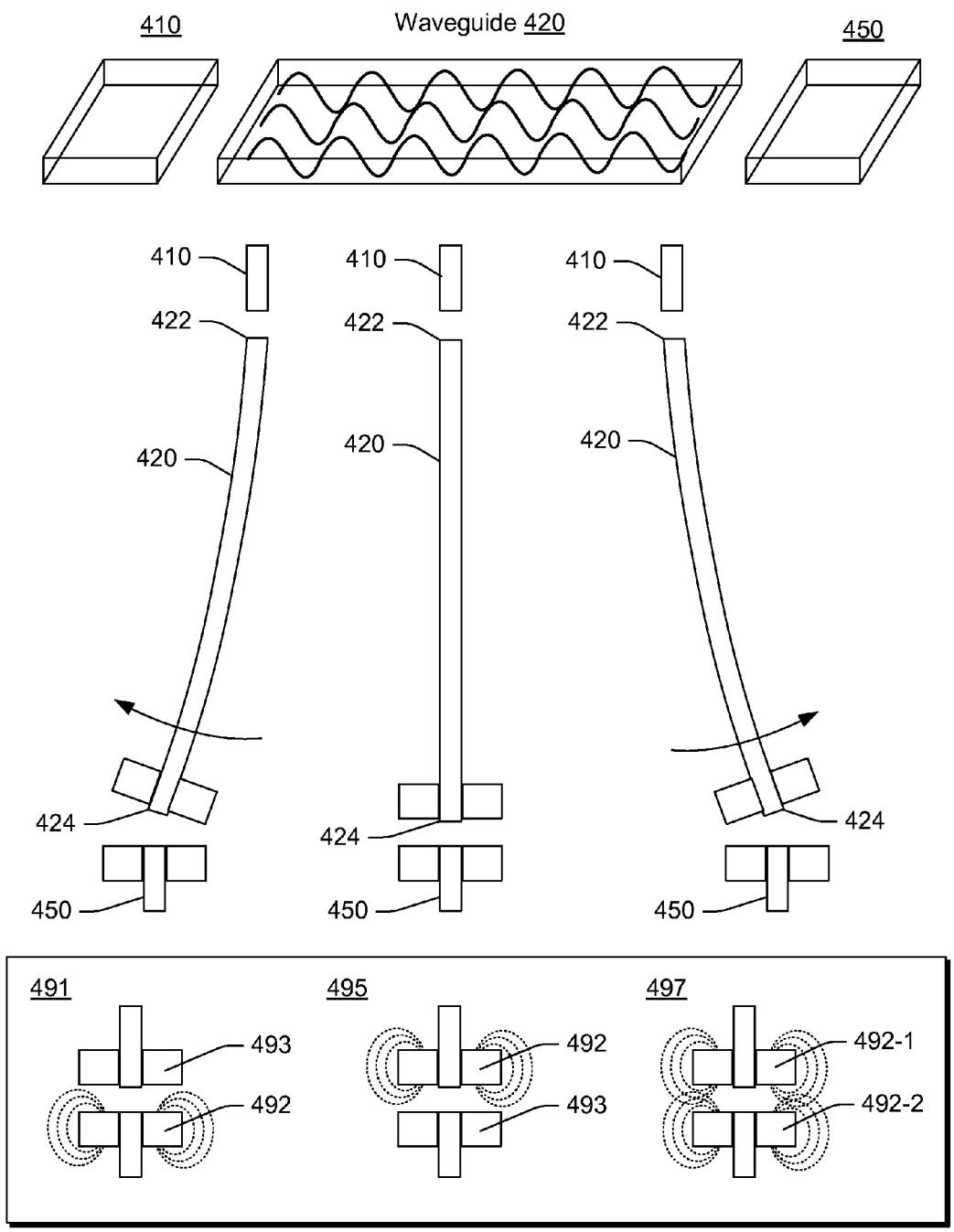
FIG. 4 is a series of diagrams of an example of a waveguide and examples of arrangements of components.

FIG. 4 shows an example of a waveguide 420 with respect to interfaces 410 and 450, which may be disposed at opposing ends 422 and 424 of the waveguide 420. FIG. 4 shows examples of arrangements 491, 495 and 497 for components that may provide for alignment of a free end of a waveguide such as the waveguide 420.

As shown, the arrangement 491 includes a magnet 492 and a component 493 that is attracted to the magnet 492. In such an example, the component 493 may be coupled to a waveguide to align the waveguide with an interface, for example, where the magnet 492 is positioned at or near the interface to promote alignment of the waveguide and the interface.

As shown, the arrangement 495 includes a magnet 492 and a component 493 that is attracted to the magnet 492. In such an example, the magnet 492 may be coupled to a waveguide to align the waveguide with an interface, for example, where the component 493 is positioned at or near the interface to promote alignment of the waveguide and the interface.

As shown, the arrangement 497 includes a magnet 492-1 and a magnet 492-2 that is attracted to the magnet 492-1 (e.g., and vice versa). In such an example, the magnet 492-1 may be coupled to a waveguide to align the waveguide with an interface, for example, where the magnet 492-2 is positioned at or near the interface to promote alignment of the waveguide and the interface.

Figure 5:
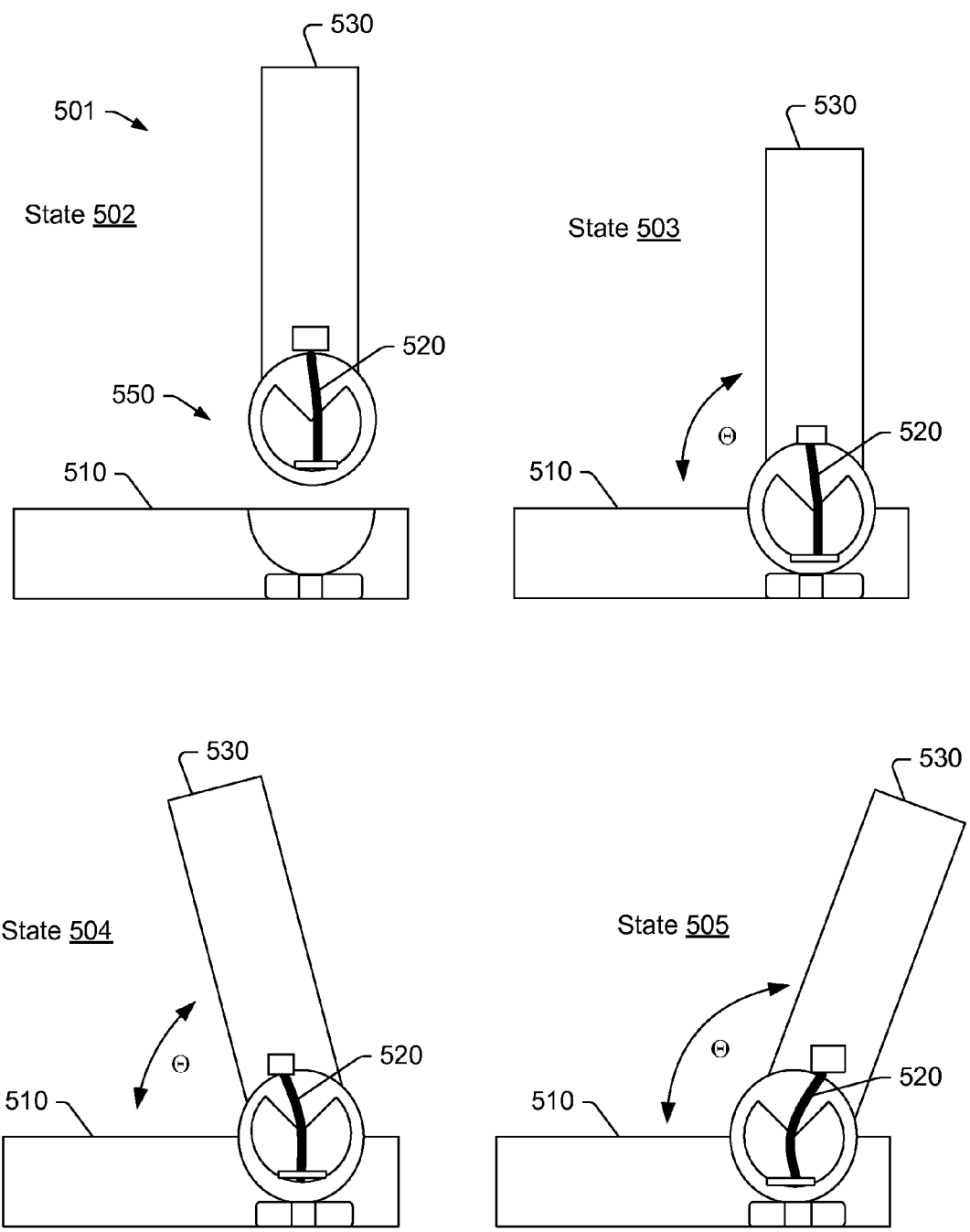
FIG. 5 is a diagram of an example of a system.

FIG. 5 shows an example of a system 501 that includes a unit 510 and a unit 530 that may be configured in various states 502, 503, 504 and 505. As shown, the system 501 includes a mechanism 550 for coupling the unit 510 and the unit 530. The mechanism 550 further provides for pivotably orientating the unit 530 with respect to the unit 510. In the example of FIG. 5, the unit 503 includes a waveguide 520, which may be a polymer ribbon waveguide for transmission of information carried by EHF RF energy. As an example, the mechanism 550 may include a cylindrical body with a cavity that allows for differential movement of the waveguide 520 with respect to the cylindrical body. In a global coordinate system, the mechanism 550 may allow an end of the waveguide 520 to remain stationary while another end of the waveguide 520 is moved by moving the unit 530 with respect to the unit 510. In such a manner, the mechanism 550 allows the waveguide 520 to be aligned with an interface of the unit 510 for the various states 503, 504 and 505 of the system 501.

As an example, the system 501 may include an arrangement of components, for example, such as one of the arrangements 491, 495 or 497 of FIG. 4. As an example, the system 501 may include a gravity based alignment mechanism for aligning an end of a waveguide. For example, the waveguide 520 may include a mass attached at or near a free end such that where the mechanism 550 allows for pivoting, the mass may act under the influence of gravity to direct the free end of the waveguide 520 downwardly. Such an approach may be suitable, for example, where the unit 510 of the system 501 is positioned on a horizontal surface (e.g., a table, a desk, etc.). As an example, a mass may be coupled with one or more guide components, for example, to still the mass (e.g., avoid swinging such as pendulum action, etc.).

Figure 6:
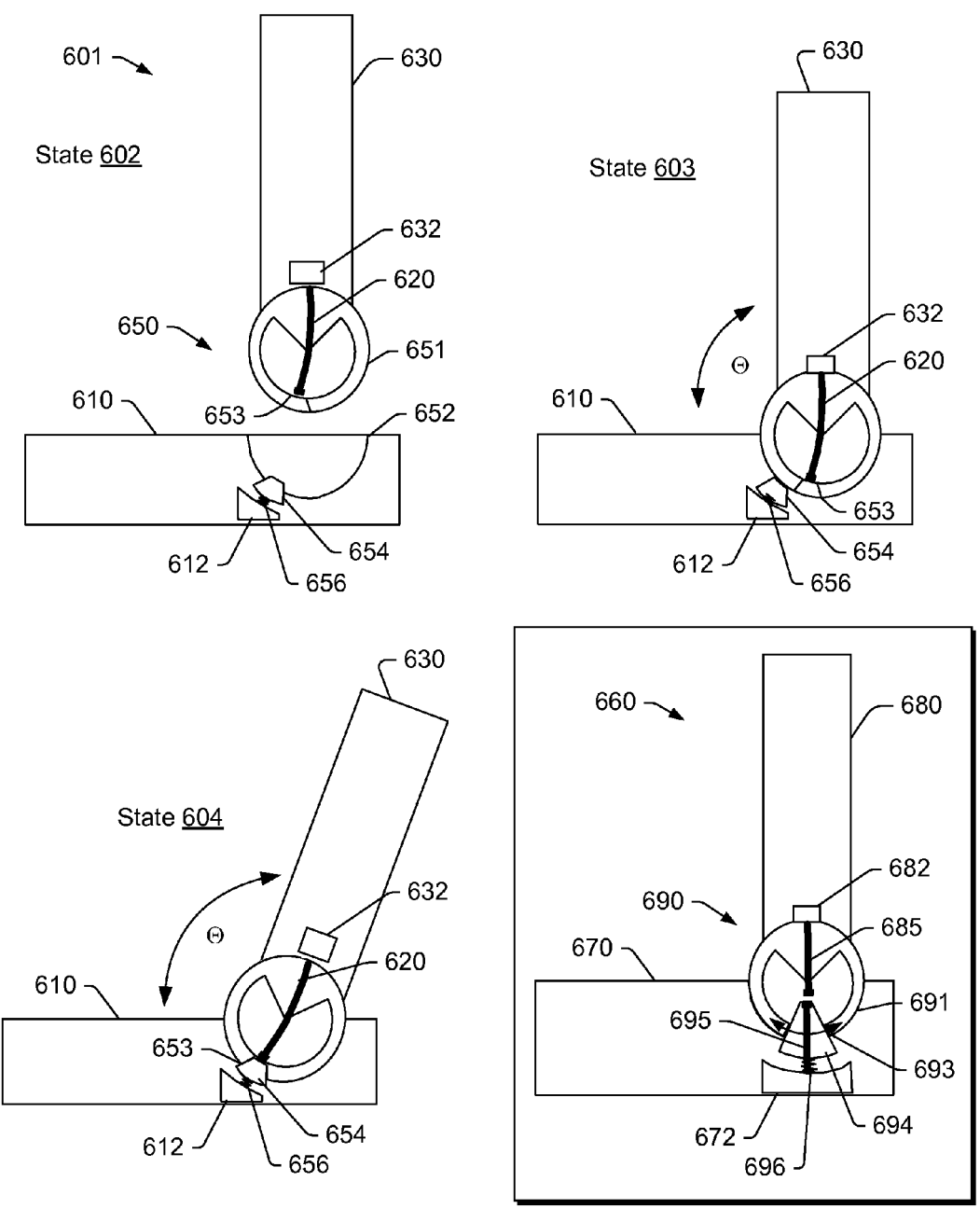
FIG. 6 is a diagram of examples of systems.

FIG. 6 shows an example of a system 601 that includes a unit 610 and a unit 630 that may be configured in various states 602, 603 and 604. As shown, the system 601 includes a mechanism 650 for coupling the unit 610 and the unit 630. The mechanism 650 further provides for pivotably orientating the unit 630 with respect to the unit 610. In the example system 601 of FIG. 6, the unit 603 includes a waveguide 620, which may be a polymer ribbon waveguide for transmission of information carried by EHF RF energy. As an example, the mechanism 650 may include a cylindrical body 651 with a notch 653 where the cylindrical body 651 is coupled to the unit 630 and the mechanism 650 may include a socket 652 and a biased detent 654, for example, biased by a spring 656. As shown, the detent 654 may be positioned in the socket 652 such that in the state 603, the cylindrical body 651 may compress the detent 654. As shown in the state 604, upon rotation of the unit 630, the cylindrical body 651 may rotate such that the detent 654 may enter the notch 653. In such an example, the detent 654 may align the waveguide 620 for purposes of transmissions, for example, between circuitry 612 of the unit 610 and circuitry 632 of the unit 630 (e.g., via alignment of the waveguide 620 with respective interfaces of the unit 610 and the unit 630).

FIG. 6 also shows an example of a system 660 that includes a unit 670, a unit 680 and a mechanism 690. As shown, the mechanism 690 may include a wedge 694 that may be flexibly biased by, for example, a spring 696. In such an example, a body 691 of the mechanism 690 may include a receptacle 693 for receipt of the wedge 694. Upon receipt, pivoting of the unit 680 with respect to the unit 670 may cause the wedge 694 to move while the mechanism 690 maintains alignment of waveguides 685 and 695 for purposes of transmission of information, for example, between circuitry 672 and 682 of the units 670 and 680, respectively (e.g., via appropriate interfaces of the units 670 and 680). In the example system 660 of FIG. 6, the waveguides 685 and 695 may be polymer ribbon waveguides for transmission of information carried by EHF RF energy. As an example, one or both of the waveguides 685 and 695 may be configured to flex, for example, consider the waveguide 695 flexing with respect to movement of the wedge 694 (e.g., due to pivoting of the unit 680 while the waveguide 685 may be fixed relative to the unit 680).

Figure 7:
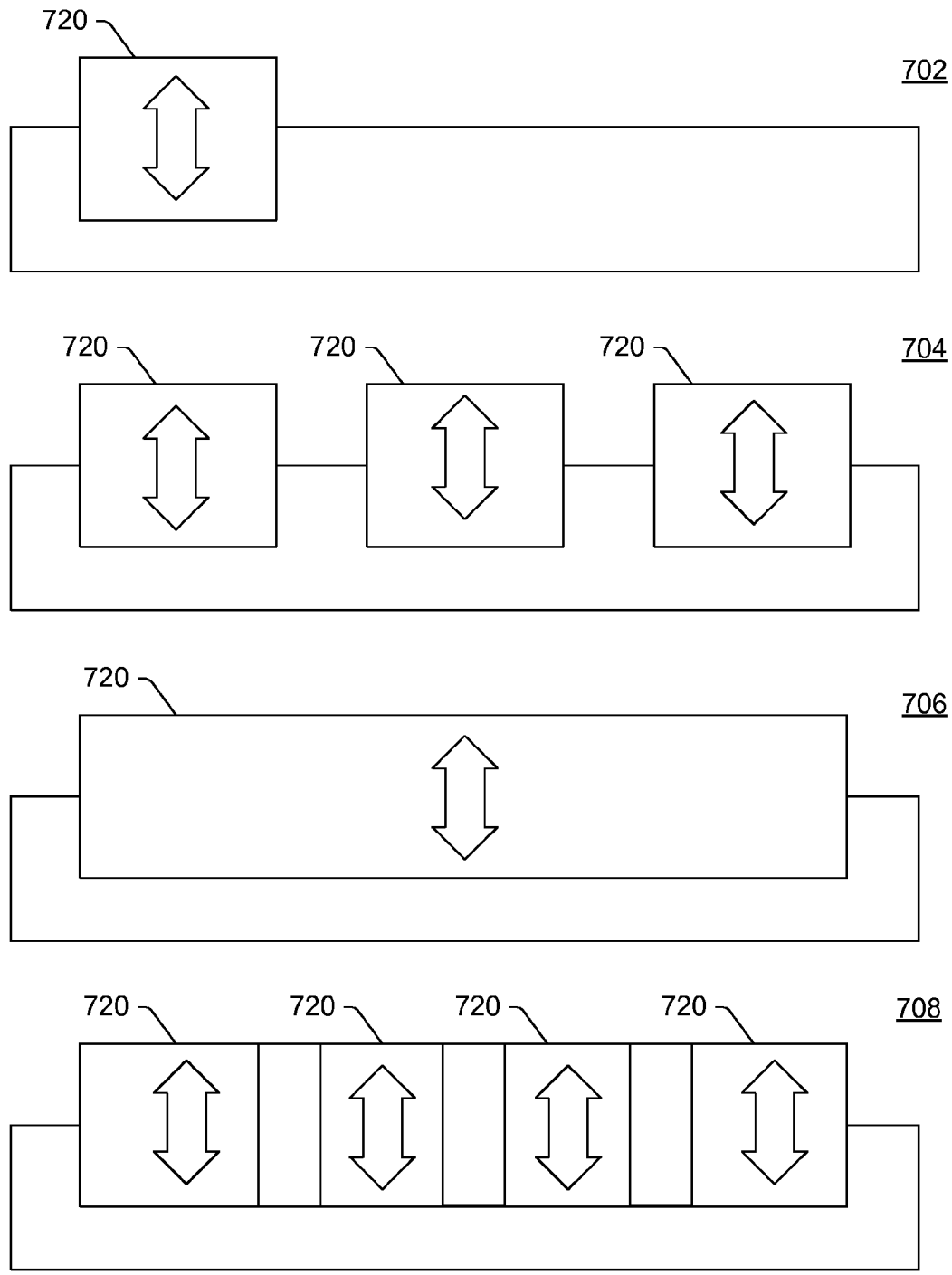
FIG. 7 is a diagram of examples of arrangements of one or more waveguides.

FIG. 7 shows various examples of arrangements 702, 704, 706 and 708 of one or more polymer ribbon waveguides 720. As an example, the arrangements 702, 704, 706 and 708 may be for a unit of a system that may be coupled to another unit of the system (see, e.g., the system 101 of FIG. 1 and the system 201 of FIG. 2). In the arrangement 702, a single polymer ribbon waveguide 720 is provided for bridging interfaces of units of a system. In the arrangement 704, a plurality of single polymer ribbon waveguides 720 are provided for bridging interfaces of units of a system. In the arrangement 706, a single polymer ribbon waveguide 720 is provided for bridging interfaces of units of a system. In the arrangement 708, a series of coupled single polymer ribbon waveguides 720 are provided for bridging interfaces of units of a system. In such an example, the waveguides 720 may be coupled by flexible material.

Figure 8:
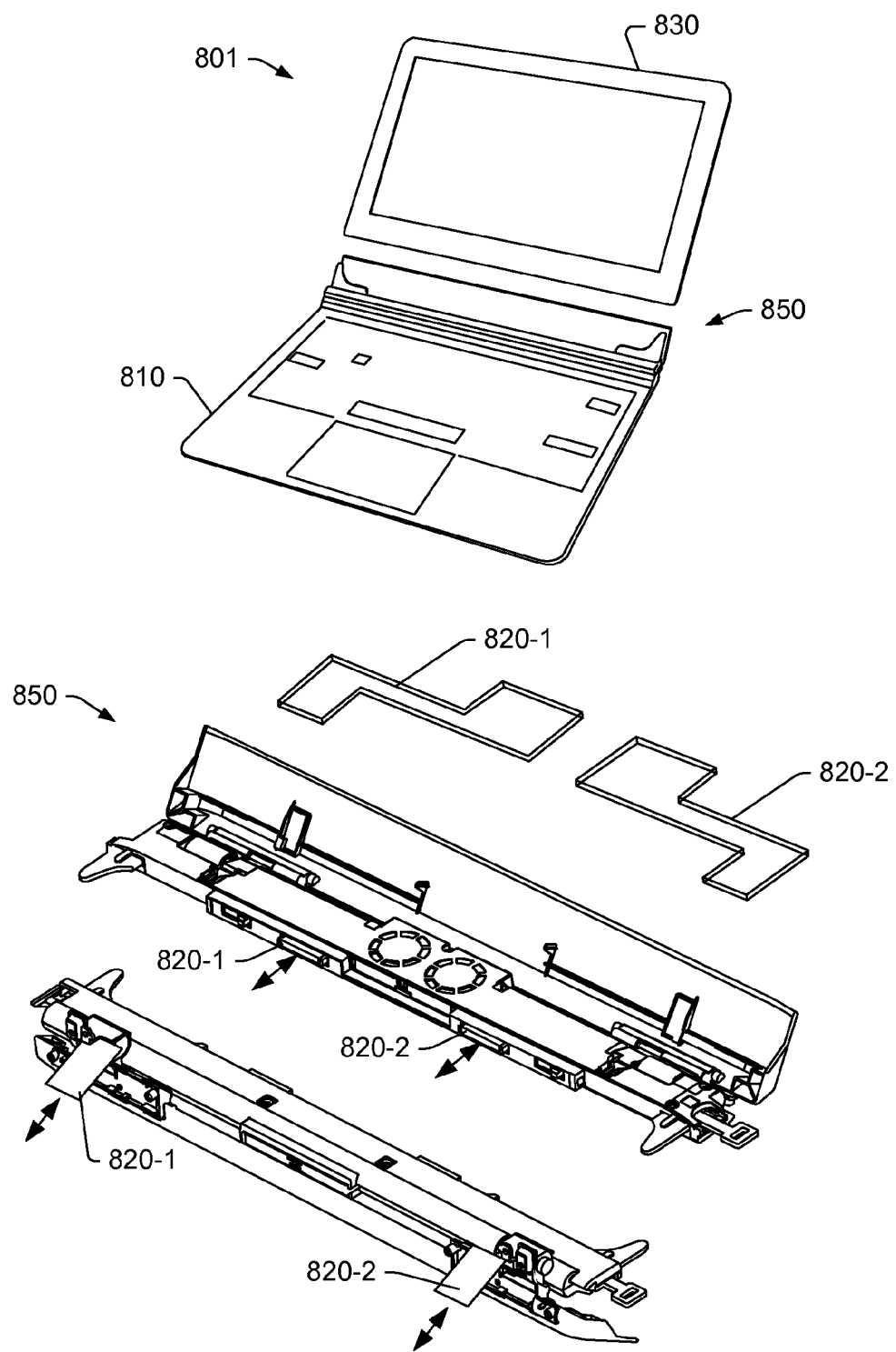
FIG. 8 is a diagram of an example of a system.

FIG. 8 shows an example of a system 801 that includes a unit 810 and a unit 830 that may be configured in various states including a coupled state and a decoupled state. As shown, the system 801 includes a mechanism 850 for coupling the unit 810 and the unit 830 where the mechanism 850 includes a plurality of polymer ribbon waveguides 820-1 and 820-2. As an example, the mechanism 850 may include a hinge where the polymer ribbon waveguides 820-1 and 820-2 can bend as the unit 830 pivots about the hinge with respect to the unit 810. As an example, the mechanism 850 may be connected to the unit 810 via bolts or other connectors while the unit 830 may be operatively coupled to and decoupled from the mechanism 850, for example, via prongs that may extend from the mechanism 850 for receipt by receptors of the unit 830. The mechanism 850 may further includes, as an example, a lock for locking the unit 830 to the mechanism 850 (e.g., and thereby to the unit 810). Such a lock may be actuated via a sliding bar, for example, that may include a grip.

As an example, a system can include a display unit that includes extremely high frequency (EHF) radio frequency band communication circuitry; a base unit that includes extremely high frequency (EHF) radio frequency band communication circuitry; a mechanism that releasably couples the display unit and the base unit to define a coupled state; a hinge that orients the display unit with respect to the base unit in the coupled state; and a polymer ribbon waveguide that interconnects the communication circuitry of the display unit and the communication circuitry of the base unit in the coupled state.

As an example, a hinge may include a base unit portion and a corresponding display unit portion. As an example, a mechanism may include a socket, for example, to receive a portion of a unit. As an example, a socket may be a semi-cylindrical socket configured to receive a cylindrical portion of a unit, for example, to allow for piviotable movement of the unit.

As an example, a polymer ribbon waveguide can include a fixed end and a movable end. In such an example, a system can include a movable alignment component attached to the polymer ribbon waveguide. As an example, a movable alignment component may be or include a magnet. As an example, a system may include a fixed alignment component (e.g., which may cooperate with a magnet or other component). As an example, a fixed alignment component may be or include a magnet.

As an example, a system may include magnetic components that can bend a polymer ribbon waveguide an amount based on degree of orientation of a display unit with respect to a base unit. In such an example, the magnetic components can include at least one fixed magnetic component and at least one movable magnetic component.

As an example, a system may include a detent and a notch for aligning a polymer ribbon waveguide. For example, a portion of one unit of the system may include a detent and a portion of another unit of the system may include a notch, which may, for example, receive at least a portion of the detent. In such an example, the detent may allow for some pivoting of the units with respect to each other or, for example, may limit pivoting. As an example, upon application of force, a detent may exit a notch, for example, where a unit is pivoted with sufficient application of force, a detent may be configured to exit a notch. As an example, a system can include a wedge and a receptacle for aligning the polymer ribbon waveguide. In such an example, the wedge may move, for example, where the receptacle is moved (e.g., pivoted about an axis such as a hinge axis).

As an example, a hinge may include a portion of a cylinder. In such an example, a polymer ribbon waveguide may include a movable end disposed within the portion of the cylinder (e.g., movable with respect to the portion of the cylinder). As an example, a display unit may include a portion of a cylinder, for example, where a base unit includes a socket configured for receipt of the portion of the cylinder (e.g., for rotation of the portion of the cylinder in the socket for orienting the display unit with respect to the base unit).

As an example, a polymer ribbon waveguide may include a siloxane polymer. In such an example, the siloxane polymer may be formed to transmit EHF RF energy (e.g., EHF RF energy waves). As an example, a polymer ribbon waveguide may include polyurethane. As an example, a polymer ribbon waveguide may include polyimide. As an example, a polymer ribbon waveguide may be a plastic formed of organic polymers and optionally one or more other substances. As an example, a polymer ribbon waveguide may be coated, for example, on one or more sides.

As an example, a system can include a display unit that includes a processor, memory accessible by the processor, a display operatively coupled to the processor and extremely high frequency (EHF) radio frequency band communication circuitry operatively coupled to the processor; a base unit that includes extremely high frequency (EHF) radio frequency band communication circuitry; a mechanism that releasably couples the display unit and the base unit to define a coupled state; and a polymer ribbon waveguide that interconnects the communication circuitry of the display unit and the communication circuitry of the base unit in the coupled state. Such a system may include, for example, a hinge that orients the display unit with respect to the base unit in the coupled state. As an example, such a system may include a set of magnets that bend the polymer ribbon waveguide an amount based on degree of orientation of the display unit with respect to the base unit.

As an example, a system can include a display unit that includes a display and extremely high frequency (EHF) radio frequency band communication circuitry; a base unit that includes a processor, memory accessible by the processor, and extremely high frequency (EHF) radio frequency band communication circuitry operatively coupled to the processor; a mechanism that releasably couples the display unit and the base unit to define a coupled state; and a polymer ribbon waveguide that interconnects the communication circuitry of the display unit and the communication circuitry of the base unit in the coupled state. Such a system may include, for example, a hinge that orients the display unit with respect to the base unit in the coupled state. As an example, such a system may include a set of magnets that bend the polymer ribbon waveguide an amount based on degree of orientation of the display unit with respect to the base unit.

As an example, a method may include providing a display unit that includes extremely high frequency (EHF) radio frequency band communication circuitry, a base unit that includes extremely high frequency (EHF) radio frequency band communication circuitry, a mechanism that releasably couples the display unit and the base unit to define a coupled state, a hinge that orients the display unit with respect to the base unit in the coupled state, and a polymer ribbon waveguide that interconnects the communication circuitry of the display unit and the communication circuitry of the base unit in the coupled state; aligning a free end of the polymer ribbon waveguide; and transmitting information between the communication circuitry of the display unit and the communication circuitry of the base unit via the polymer ribbon waveguide. In such an example, the method may include aligning magnetic fields. As an example, a method may include aligning responsive to a change in orientation of the display unit with respect to the base unit.

As described herein, various acts, steps, etc., may be implemented as instructions stored in one or more computer-readable storage media. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 9:
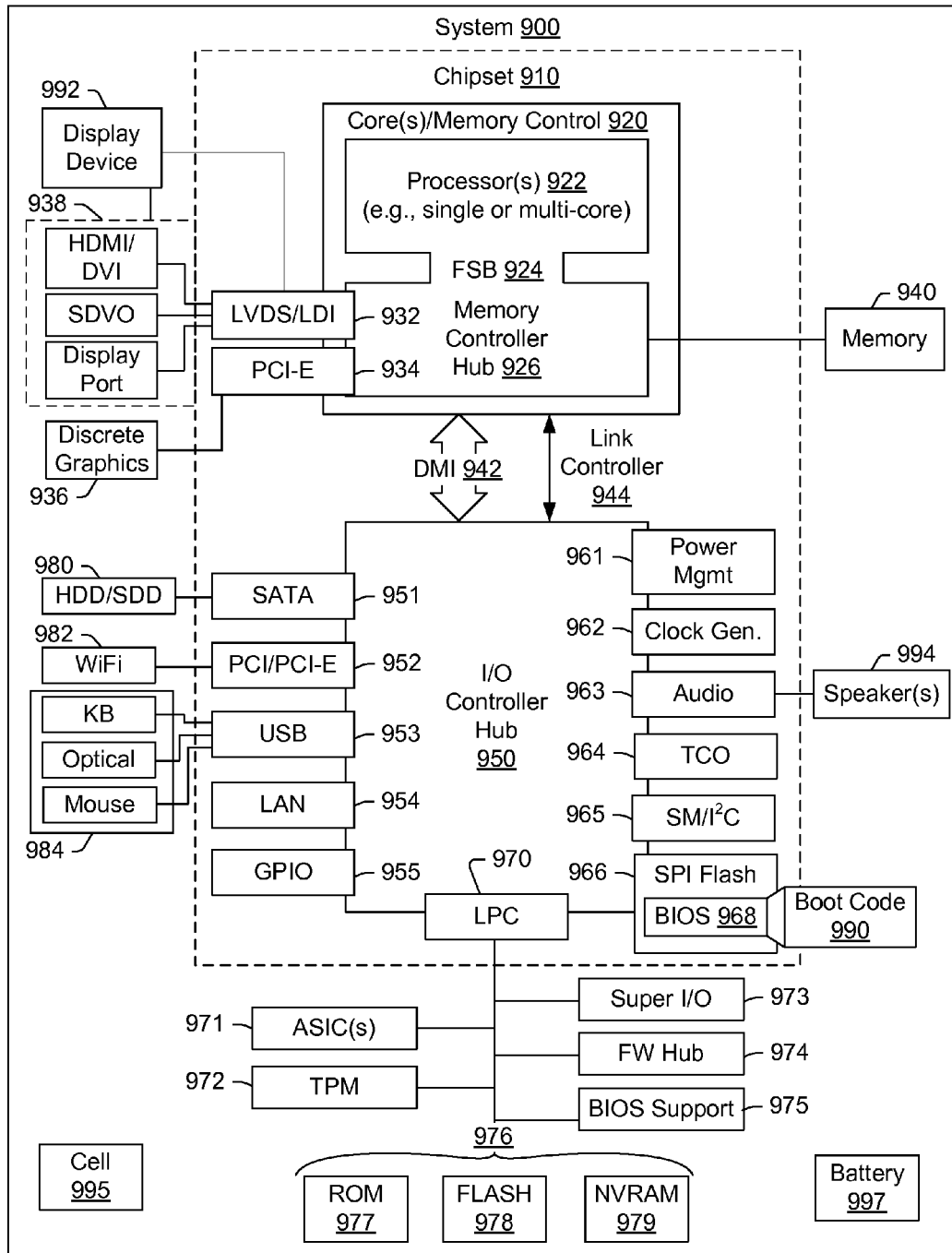
FIG. 9 is a diagram of an example of a machine.

While various examples of circuits or circuitry have been discussed, FIG. 9 depicts a block diagram of an illustrative computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 900. As an example, a system such as the system 101 of FIG. 1 may include at least some of the features of the system 900 (e.g., in one or more of the units 110 and 130 of the system 101).

As shown in FIG. 9, the system 900 includes a so-called chipset 910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for reading, writing or reading and writing information on one or more drives 980 such as HDDs, SDDs or a combination thereof.

The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, mice and various other devices (e.g., microphones, cameras, phones, storage, media players, etc.). On or more other types of sensors may optionally rely on the USB interface 953 or another interface (e.g., I²C, etc.). As to microphones, the system 900 of FIG. 9 may include hardware (e.g., audio card) appropriately configured for receipt of sound (e.g., user voice, ambient sound, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, a satellite, a base, a server or other machine may include fewer or more features than shown in the system 900 of FIG. 9. Further, the system 900 of FIG. 9 is shown as optionally include cell phone circuitry 995, which may include GSM, CDMA, etc., types of circuitry configured for coordinated operation with one or more of the other features of the system 900. Also shown in FIG. 9 is battery circuitry 997, which may provide one or more battery, power, etc., associated features (e.g., optionally to instruct one or more other components of the system 900). As an example, a SMBus may be operable via a LPC (see, e.g., the LPC interface 970), via an I²C interface (see, e.g., the SM/I²C interface 965), etc.

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:
1. A system comprising:
   a display unit that comprises extremely high frequency (EHF) radio frequency band communication circuitry;
   a base unit that comprises extremely high frequency (EHF) radio frequency band communication circuitry;
   a mechanism that releasably couples the display unit and the base unit to define a coupled state;
   a hinge that orients the display unit with respect to the base unit in the coupled state;

a polymer ribbon waveguide that interconnects the communication circuitry of the display unit and the communication circuitry of the base unit in the coupled state; and magnetic components that bend the polymer ribbon waveguide an amount based on degree of orientation of the display unit with respect to the base unit wherein the magnetic components comprise at least one fixed magnetic component and at least one movable magnetic component.

2. The system of claim 1 wherein the hinge comprises a base unit portion and a corresponding display unit portion.

3. The system of claim 1 wherein the mechanism comprises a socket.

4. The system of claim 1 wherein the polymer ribbon waveguide comprises a fixed end and a movable end.

5. The system of claim 4 wherein at least one of the at least one movable magnetic component is attached to the polymer ribbon waveguide.

6. The system of claim 5 wherein the at least one of the at least one movable magnetic component comprises a piece of magnetic material.

7. The system of claim 1 comprising a detent and a notch for aligning the polymer ribbon waveguide.

8. The system of claim 1 comprising a wedge and a receptacle for aligning the polymer ribbon waveguide.

9. The system of claim 1 wherein the hinge comprises a portion of a cylinder.

10. The system of claim 9 wherein the polymer ribbon waveguide comprises a movable end disposed within the portion of the cylinder.

11. The system of claim 9 wherein the display unit comprises the portion of the cylinder.

12. The system of claim 1 wherein the polymer ribbon waveguide comprises an organic polymer.

13. A system comprising:
a display unit that comprises a processor, memory accessible by the processor, a display operatively coupled to the processor and extremely high frequency (EHF) radio frequency band communication circuitry operatively coupled to the processor;
a base unit that comprises extremely high frequency (EHF) radio frequency band communication circuitry;
a mechanism that releasably couples the display unit and the base unit to define a coupled state;
a polymer ribbon waveguide that interconnects the communication circuitry of the display unit and the communication circuitry of the base unit in the coupled state; and
a set of magnets that bend the polymer ribbon waveguide an amount based on degree of orientation of the display unit with respect to the base unit.

14. The system of claim 13 further comprising a hinge that orients the display unit with respect to the base unit in the coupled state.

15. A system comprising:
a display unit that comprises a display and extremely high frequency (EHF) radio frequency band communication circuitry;
a base unit that comprises a processor, memory accessible by the processor, and extremely high frequency (EHF) radio frequency band communication circuitry operatively coupled to the processor;
a mechanism that releasably couples the display unit and the base unit to define a coupled state;
a polymer ribbon waveguide that interconnects the communication circuitry of the display unit and the communication circuitry of the base unit in the coupled state; and
a set of magnets that bend the polymer ribbon waveguide an amount based on degree of orientation of the display unit with respect to the base unit.

16. The system of claim 15 further comprising a hinge that orients the display unit with respect to the base unit in the coupled state.

* * * * *